(12) United States Patent
Yoshikane et al.

(10) Patent No.: US 9,919,822 B2
(45) Date of Patent: Mar. 20, 2018

(54) GAS CHARGING APPARATUS FOR A BAG EQUIPPED WITH GAS COMPARTMENT PORTION

(71) Applicant: TOYO JIDOKI CO., LTD., Tokyo (JP)

(72) Inventors: Tohru Yoshikane, Iwakuni (JP); Kenji Kawamura, Iwakuni (JP); Norikazu Sunouchi, Toyonaka (JP)

(73) Assignee: Toyo Jidoki Co., Ltd., Minato-ku, Tokyo (JP)

( * ) Notice: Subject to any disclaimer, the term of this patent is extended or adjusted under 35 U.S.C. 154(b) by 820 days.

(21) Appl. No.: 14/220,401

(22) Filed: Mar. 20, 2014

(65) Prior Publication Data
US 2014/0283483 A1 Sep. 25, 2014

(30) Foreign Application Priority Data
Mar. 20, 2013 (JP) .................. 2013-057416

(51) Int. Cl.
| | |
|---|---|
| *B65B 31/04* | (2006.01) |
| *B65B 31/00* | (2006.01) |
| *B65B 43/46* | (2006.01) |
| *B65B 55/20* | (2006.01) |
| *B29L 31/00* | (2006.01) |

(Continued)

(52) U.S. Cl.
CPC .......... *B65B 31/048* (2013.01); *B65B 31/006* (2013.01); *B65B 31/04* (2013.01);
(Continued)

(58) Field of Classification Search
CPC ....... B65B 31/00; B65B 31/006; B65B 31/04; B65B 31/048; B65B 61/00; B65B 31/06; B65B 43/465; B65B 55/20; B31D 5/0073
(Continued)

(56) References Cited

U.S. PATENT DOCUMENTS 4,136,502 A * 1/1979 Shore ...................... B29C 65/18
53/493
5,447,235 A * 9/1995 Pharo ................... B65D 81/052
206/522
(Continued)

FOREIGN PATENT DOCUMENTS

| | | |
|---|---|---|
| JP | 4771785 B | 9/2011 |
| JP | 5104073 B | 12/2012 |

*Primary Examiner* — Hemant M Desai
*Assistant Examiner* — Eduardo R Ferrero
(74) *Attorney, Agent, or Firm* — Norton Rose Fulbright US LLP

(57) ABSTRACT

A method and apparatus for charging the gas compartment portion of a bag (1) in which incisions (9) are formed in gas introduction section (6*a*) of the gas compartment portion (6). A pair of gas injection nozzles (23, 24) are disposed so as to be on the opposite sides of the bag and reciprocate between its standby and advanced positions, so that in the advanced position, the discharge outlets (23*a*, 24*a*) of the gas injection nozzles are aligned with the gas introduction section on both sides, and compressed gas is injected into the gas introduction section through the incisions. A small gap (L) is provided between the discharge outlets of the gas injection nozzles when they are in the advanced position. As the gas is injected, film sheets of the expanded gas introduction section closely adhere to the discharge outlets, so that the gas injection state becomes stable.

2 Claims, 13 Drawing Sheets

(51) Int. Cl.
  *B29C 65/18* (2006.01)
  *B29C 65/78* (2006.01)
  *B29C 65/00* (2006.01)

(52) U.S. Cl.
  CPC ............ B65B 43/465 (2013.01); B65B 55/20 (2013.01); *B29C 65/18* (2013.01); *B29C 65/7841* (2013.01); *B29C 65/7882* (2013.01); *B29C 66/0342* (2013.01); *B29C 66/1122* (2013.01); *B29C 66/3452* (2013.01); *B29C 66/43121* (2013.01); *B29C 66/83221* (2013.01); *B29C 66/849* (2013.01); *B29L 2031/7128* (2013.01)

(58) Field of Classification Search
  USPC ...................................................... 53/79, 403
  See application file for complete search history.

(56) References Cited

U.S. PATENT DOCUMENTS

| | | | | |
|---|---|---|---|---|
| 5,788,121 A * | 8/1998 | Sasaki | .................. | B65D 77/065 222/105 |
| 6,569,283 B1 * | 5/2003 | Sperry | .................. | B29C 65/342 156/580 |
| 7,444,795 B2 * | 11/2008 | Yasuhira | ............... | B65B 43/465 53/133.2 |
| 7,621,104 B2 * | 11/2009 | Piucci | .................... | B31B 37/00 53/403 |
| 7,926,507 B2 * | 4/2011 | Wetsch | ............... | B31D 5/0073 137/223 |
| 8,661,772 B2 * | 3/2014 | Yasuhira | ................. | B65B 55/20 206/522 |
| 8,745,960 B2 * | 6/2014 | Kannankeril | ........ | B31D 5/0073 53/284.7 |
| 2007/0089377 A1 * | 4/2007 | Yasuhira | ............... | B65B 43/465 53/403 |
| 2007/0092164 A1 * | 4/2007 | Yasuhira | ................. | B65B 55/20 383/3 |
| 2010/0281831 A1 * | 11/2010 | Kannankeril | ........ | B31D 5/0073 53/432 |
| 2011/0192490 A1 * | 8/2011 | Wetsch | ............... | B31D 5/0073 141/1 |

* cited by examiner

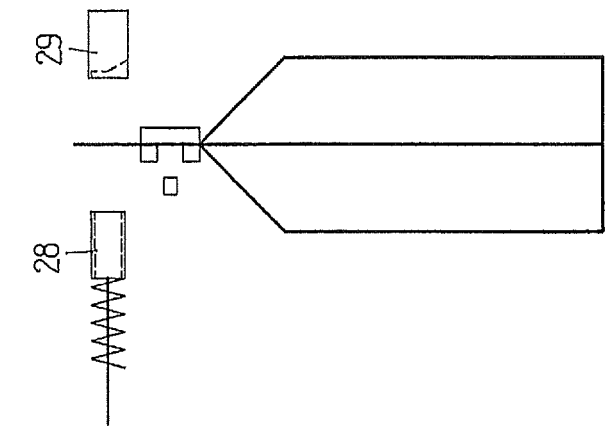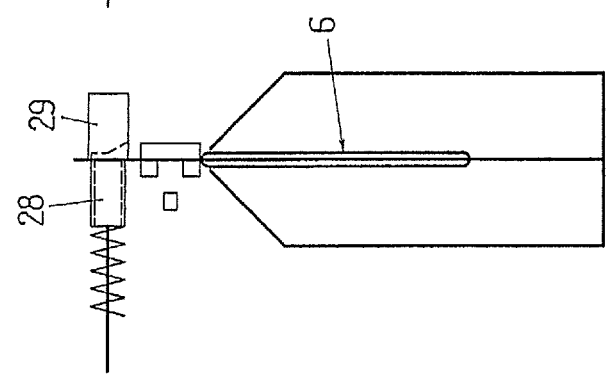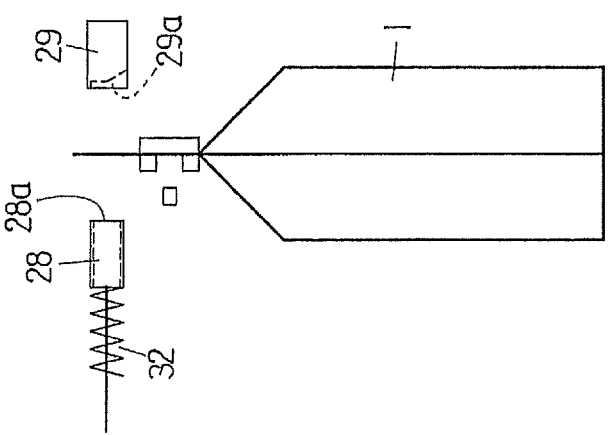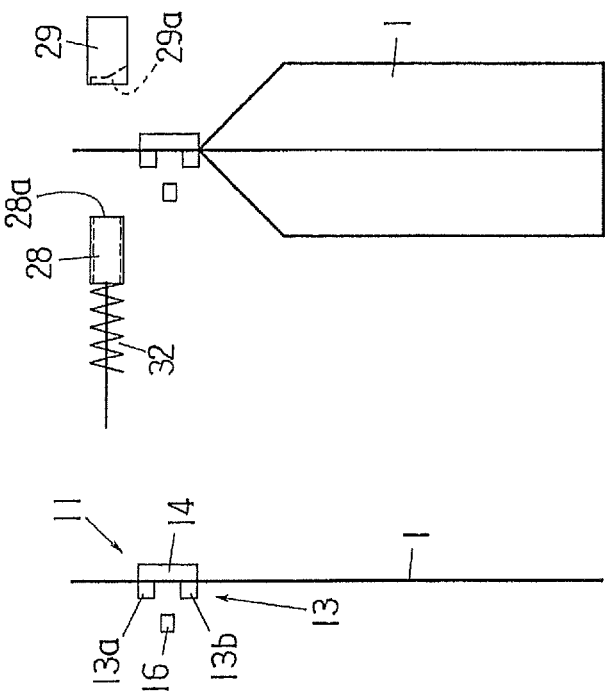

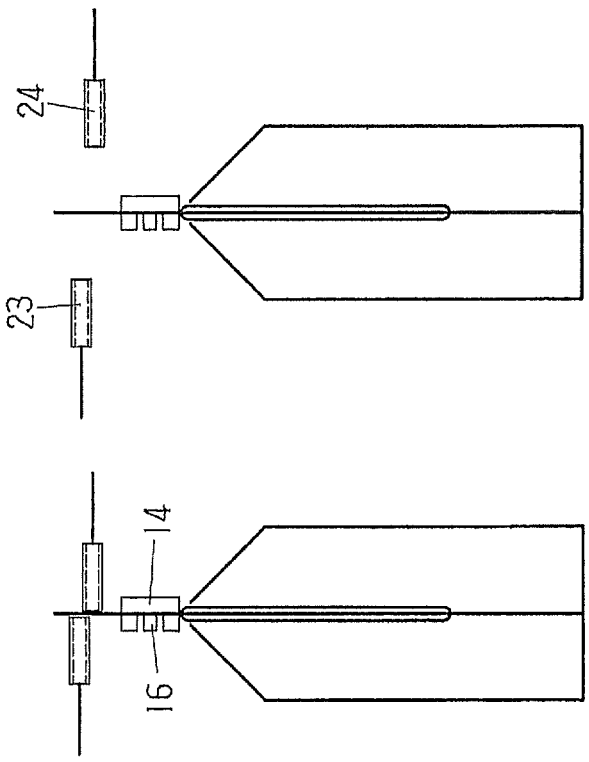
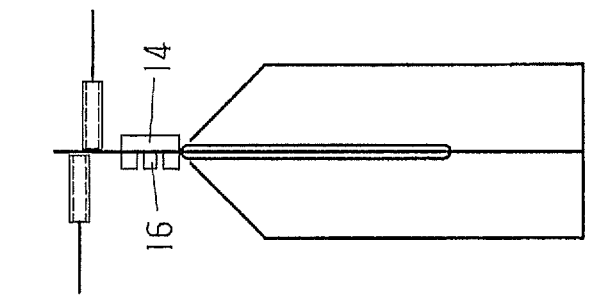
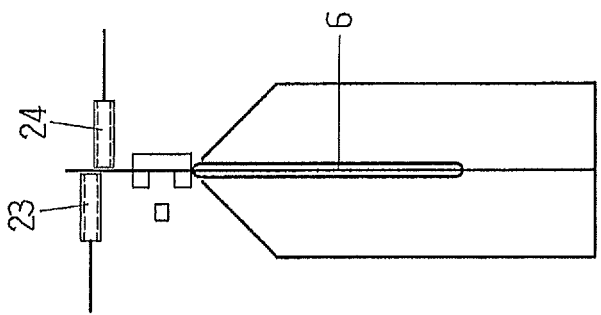
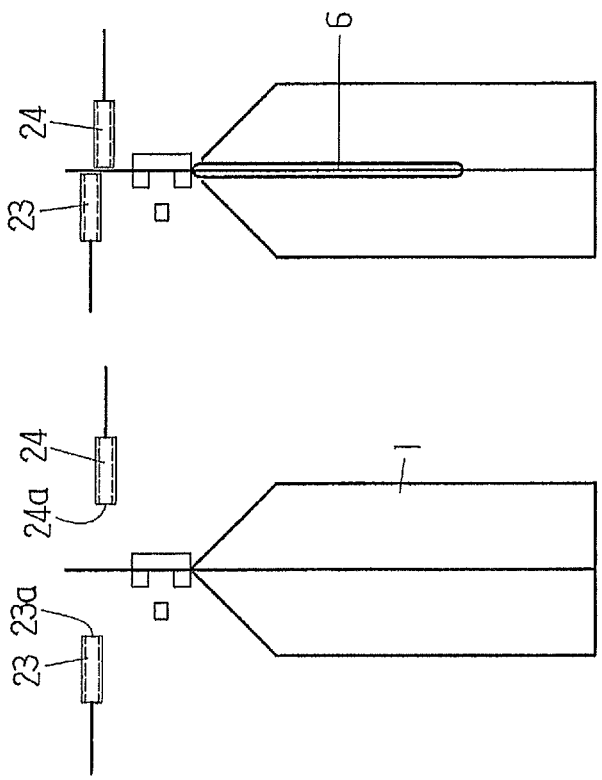

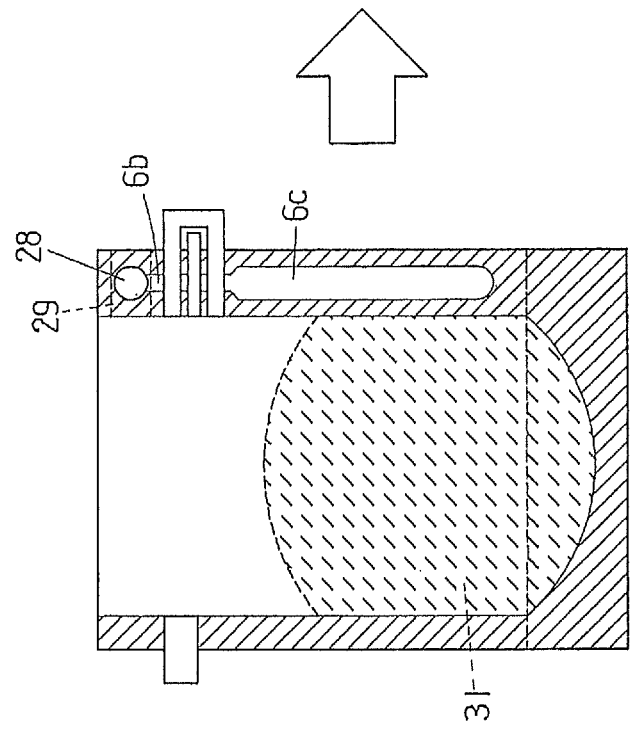
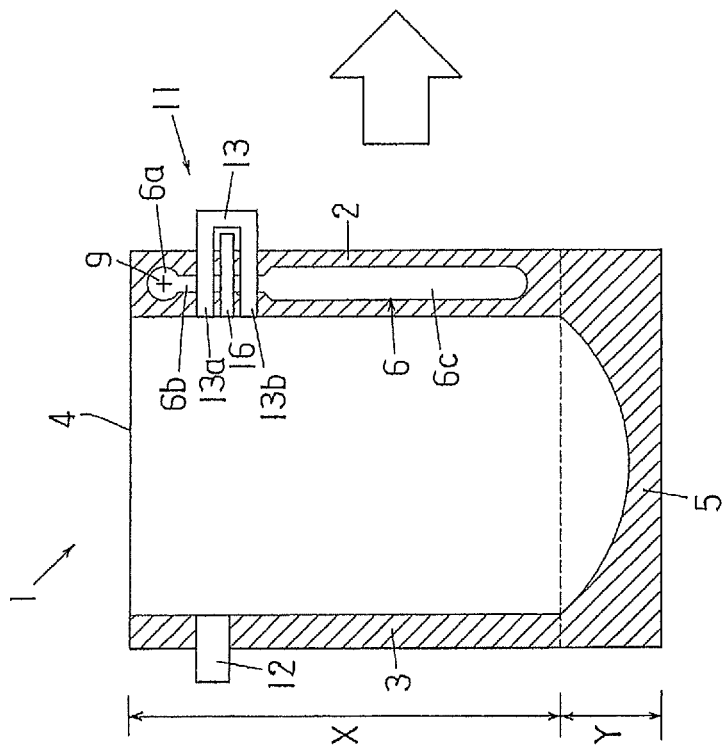

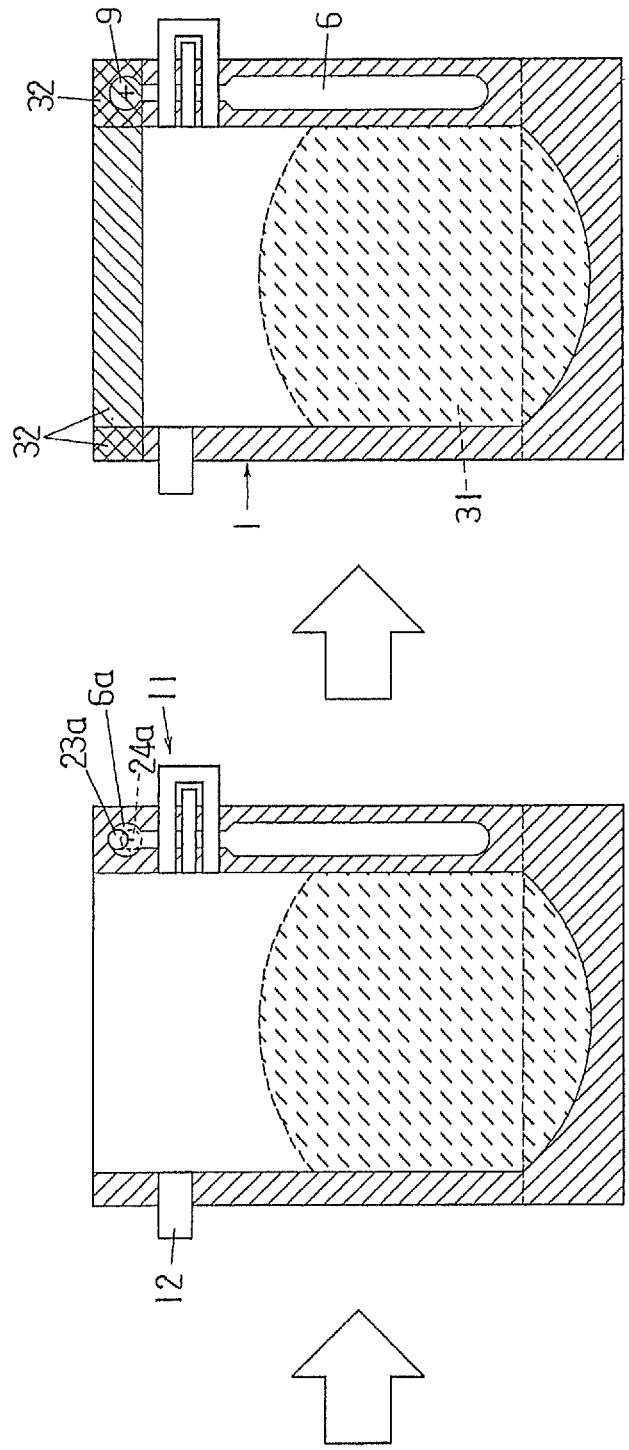

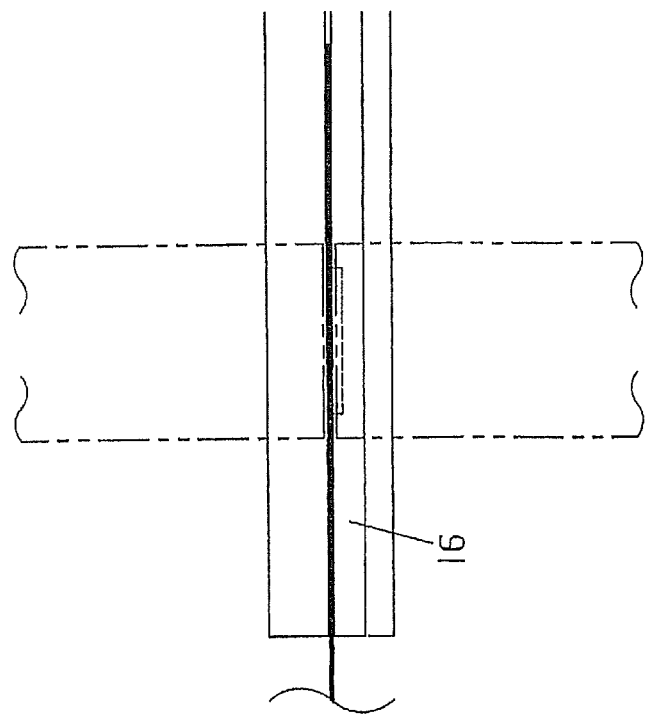
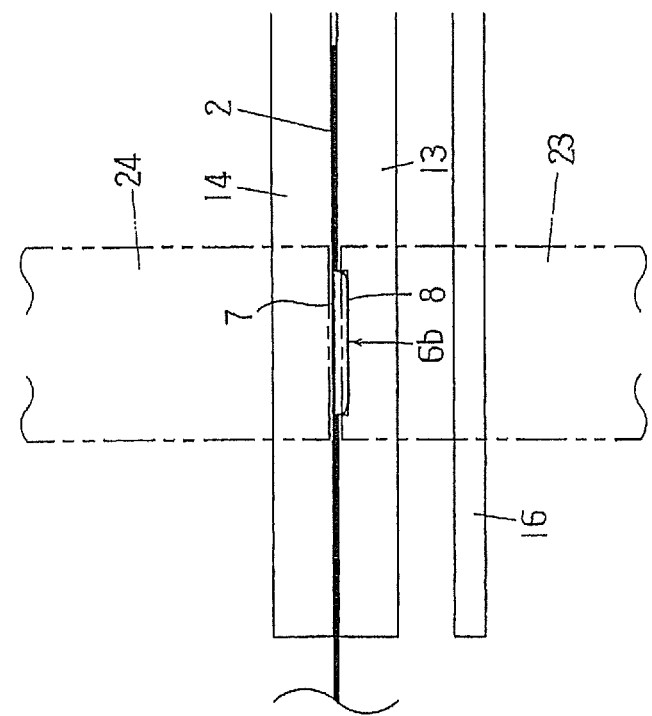

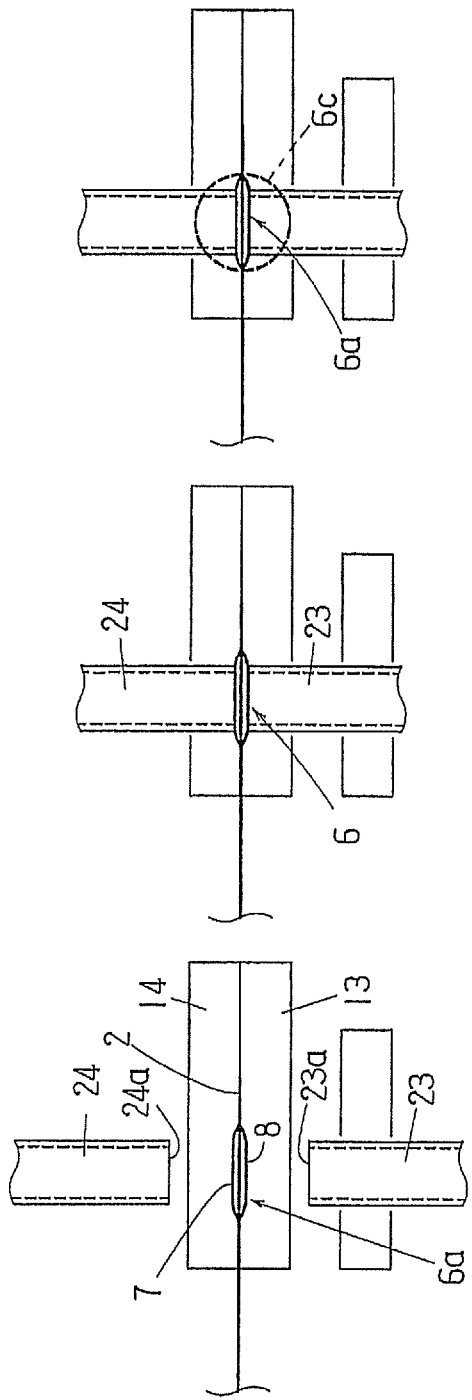

GAS CHARGING APPARATUS FOR A BAG EQUIPPED WITH GAS COMPARTMENT PORTION

BACKGROUND OF THE INVENTION

1. Field of the Invention

The present invention relates to a method and apparatus for charging a gas into a bag and more particularly to a method and apparatus for charging a gas into a gas compartment portion provided in a sealed side edge portion of a bag.

2. Description of the Related Art

Japanese Patent No. 4,771,785 describes a method and apparatus for charging a gas into a gas compartment portion of a bag in which a gas compartment portion is formed integrally and extends in the longitudinal direction in a sealed side edge portion of the bag.

More specifically in this gas filing method of Japanese Patent No. 4,771,785, an incision or an opening (collectively called "gas inlet") that places the exterior of the bag in communication with the interior of the gas compartment portion is formed in the film sheet of a gas introduction section of the gas compartment portion, and the interior of the gas compartment portion is charged with gas by aligning the discharge outlet of a gas injection nozzle connected to a pressurized gas supply source with the gas introduction section, supporting the rear side of the bag equipped with gas compartment portion using a receiving member, and injecting gas from the gas injection nozzle into the gas compartment portion through the gas inlet. Further, while the injection is in progress, cramping is made to the gas introduction section or a blockage region in a vicinity thereof on both sides of the bag using a gas blocking gripper to thereby block the fluid communication of gas between the gas introduction section and the interior of the gas compartment portion, and, while cramping the blockage region with the gas blocking gripper, the bag is pressure-held on both sides of the gas introduction section by hot plates to heat-seal the gas introduction section so as to encapsulate the gas inside the gas compartment portion.

In Japanese Patent No. 4,771,785, when the gas injection nozzle is biased forward by a compression spring, and a discharge outlet at the distal end thereof is aligned with the gas introduction section of the gas compartment portion of the bag, the discharge outlet abuts the gas introduction section or the film sheet around it, the receiving member abuts the film sheet on the rear side, the compression spring is slightly compressed, and the two film sheets of the gas introduction section tightly adhere to each other. If gas discharge from the discharge outlet starts in this state, then under the gas pressure, the gas injection nozzle retreats against the bias of the compression spring, a small gap forms as a result between the discharge outlet and the receiving member, the gas introduction section expands under the pressure of the gas injected through the gas inlet, a space forms between the two film sheets of the gas introduction section, and gas is injected through this space into the gas compartment portion.

The method of Japanese Patent No. 5,104,073 is for a bag in which the gas compartment portion to be charged with gas through an incision or opening (collectively called "gas inlet") formed at the upper edge of the gas compartment portion of a sealed side edge portion of a bag and in which an elongated (narrow) gas filling pathway is formed in the vicinity of (directly underneath) the area where the gas inlet is formed; and gas is injected through the gas inlet into the interior of the gas compartment portion, and, while the injection is in progress, heat sealing is performed for a part of the location of the filling pathway to seal the gas in the gas compartment portion.

In the gas charging method described in Japanese Patent No. 4,771,785, when acted upon by the pressure of the gas discharged from the discharge outlet of the gas injection nozzle, the gas injection nozzle slightly retreats against the bias of the compression spring, and as a result of which the gas introduction section is expanded by the compressed gas injected through the gas inlet, and a space forms between the two film sheets of the gas introduction section, thereby allowing gas injection into the gas compartment portion to be made. When this process is performed smoothly, the injection of gas into the gas compartment portion is accomplished within an extremely short period of time because the capacity of the gas compartment portion is not particularly large.

On the other hand, the distance that the gas injection nozzle retreats under the gas pressure varies depending on the pressure of the gas discharged from the discharge outlet of the gas injection nozzle and on the elastic force of the compression spring. This distance of retreat has a profound effect on the gas injection state, in other words, on the volume of gas entering the gas compartment portion per unit time and the pressure of the gas injected into the gas compartment portion. As a result, the time required for gas injection (or the efficiency of gas injection) and the degree of expansion of the gas compartment portion (or the pressure of the gas that fills the gas compartment portion) are profoundly influenced. For this reason, the setting of the pressure of the gas discharged from the gas injection nozzle and the elastic force of the compression spring, that is, the balancing of the two, needs to be done rigorously in order to obtain the optimum distance of retreat.

In addition, it is necessary to consider the possibility that the elastic force of the compression spring may decrease while the gas injection nozzle is used continuously. If the elastic force of the compression spring decreases even slightly, there is a possibility that the distance of retreat of the gas injection nozzle may change, the gas injection state may deteriorate (the volume of the gas entering the gas compartment portion per unit time may decrease and the pressure of the gas injected into the gas compartment portion may be reduced), and, furthermore, the gas may not getting into the gas compartment portion.

In particular, when a narrow, elongated gas charging pathway is formed at a location directly below the gas introduction section as in the bag equipped with a gas compartment portion described in Japanese Patent No. 5,104,073, then it is difficult for the gas injected into the gas compartment portion to escape, and it is also difficult to inject gas into the gas compartment portion, so that the above-described problems are particularly likely to occur.

BRIEF SUMMARY OF THE INVENTION

The present invention is made in the light of the above-described problems related to the gas charging method and apparatus (in particular, the gas injection nozzle) described in Japanese Patent No. 4,771,785, and it is an object of the present invention to provide a method and apparatus for charging a bag equipped with a gas compartment portion with gas that makes it possible to obtain an efficient and stable injection state during gas injection into the gas compartment portion without requiring difficult balancing of the pressure of the gas discharged from gas injection nozzles and the elastic force of a compression spring.

The above object is accomplished by unique steps of the present invention for a method for charging a bag equipped with a gas compartment portion with gas,
wherein
the method is for a bag formed integrally therein with a gas compartment portion extending in a longitudinal direction in a sealed side edge portion of the bag and having a gas inlet that is formed in a film sheet constituting a gas introduction section of the gas compartment portion and places an exterior of the bag in communication with an interior of the gas compartment portion, and
the method is comprised of the steps of:
aligning discharge outlets of gas injection nozzles, connected to a pressurized gas supply source, with the gas introduction section,
injecting gas from the gas injection nozzles into the gas compartment portion through the gas inlet, and
while the injection is in progress, cramping a blockage region, configured in the vicinity of the gas introduction section, on both sides of the bag with a gas blocking gripper to thereby block fluid communication of gas between the gas introduction section and the gas compartment portion, and then
while maintaining the blocked state, pressure-holding the bag in the gas introduction section or a location in a vicinity thereof from both sides of the bag with hot plates to seal the gas introduction section or a vicinity thereof and encapsulate gas in the gas compartment portion, and
wherein
a pair of gas injection nozzles are disposed on both sides of the bag so as to reciprocate between its standby position and its advanced position, respectively, and the discharge outlets of the pair of gas injection nozzles are aligned, in the advanced position, with the gas introduction section from both sides,
the method is for a bag equipped with a gas compartment portion and having gas inlets formed in the film sheets of both sides of the gas introduction section,
inside diameters of the discharge outlets of the gas injection nozzles are set to be smaller than the diameter or width of the gas introduction section,
the discharge outlets of the gas injection nozzles are positioned to face each other with a predetermined gap therebetween that is, when the gas injection nozzles arrive at the advanced position, larger than a thickness of the gas introduction section, and
the film sheets on both sides of the gas introduction section, expanded in the gap as a result of gas injection thereinto, closely adhere to the discharge outlets of the gas injection nozzles.

In the above-described gas charging method, the flow of the gas discharged from the discharge outlets concentrates in the gas introduction section due to the fact that the inside diameters of the discharge outlets of both gas injection nozzles are made to be smaller than the diameter or width of the gas introduction section. When gas is injected from both gas injection nozzles into the gas compartment portion, the gas introduction section expands or inflate in the gap which is between the discharge outlets of both gas injection nozzles, a gap is formed between the two film sheets of the gas introduction section, and compressed gas enters the gas compartment portion through the gap formed between the two film sheets. The size of the gap provided between the discharge outlets of both gas injection nozzles is sufficient to allow the two film sheet sheets of the gas introduction section expanded as a result of gas injection and closely adhere to the discharge outlets of both gas injection nozzles; in other words, it is a very small gap. When the inside diameters of the discharge outlets of both gas injection nozzles are smaller than the diameter or width of the gas introduction section, and, at the same time, when the gap is not too large, the two film sheets of the expanded gas introduction section can closely adhere to the discharge outlets. Due to the fact that the two film sheets of the gas introduction section closely adhere to the discharge outlets while the injection is in progress, the compressed gas discharged from the discharge outlets of the gas injection nozzles efficiently enters the gas introduction section through the gas inlet formed in the gas introduction section.

In the above-described gas charging method, the centers of the discharge outlets of the two gas injection nozzles do not have to coincide in the direction of gas discharge, and they can be more or less offset from each other.

For example, it can sometimes occur that when a bag equipped with a gas compartment portion is cramped by its two edges in a suspended state by a pair of grippers, the position of the gas inlet or the bag cramped by the grippers is appreciably offset from the predefined standard position. Such an offset tends to occur, for instance, when a bag equipped with a gas compartment portion is passed from a bag-supplying device to the pair of grippers, or when a bag equipped with a gas compartment portion is filled with material to be packaged, etc. In addition, in some cases the gas inlet of a bag is formed in a location slightly offset from the standard location. It should be noted that for reasons related to the manufacture of bags equipped with gas compartment portions, the incisions or openings formed in the two film sheets of the gas introduction section are formed to overlap in the same position when viewed perpendicular to the surface of the bag.

In the above-described gas charging method, when the centers of the discharge outlets of the two gas injection nozzles coincide in the direction of gas discharge, an offset in the position of the gas inlet from the standard position can preclude satisfactory gas injection depending on the magnitude of the deviation. By contrast, if the centers of the discharge outlets of both gas injection nozzles are slightly offset in advance, there is a greater chance that the gas injection will be carried out in a satisfactory manner by at least one of the gas injection nozzles. The question of in which direction and by how much to offset the centers of the discharge outlets of both gas injection nozzles should be determined by experimentally verifying in which direction the gas inlet tends to be offset from the standard position. It should be noted that when the two lateral edges of a bag equipped with a gas compartment portion are cramped by a pair of grippers, and the bag is conveyed in a suspended state so that, while it is being conveyed, the above-described gas charging method of the present invention is applied to the gas compartment portion, then good results are often obtained when the discharge outlets of both gas injection nozzles are displaced slightly in the vertical direction.

On the other hand, instead of aligning, as described above, two gas injection nozzles with the two sides of the gas introduction section of the gas compartment portion of a bag, it is also possible, as described in Japanese Patent No. 4,771,785, to use a single gas injection nozzle and a receiving member so that this single gas injection nozzle is aligned with one side of the gas introduction section and the receiving member supports the rear side of the gas introduction section. In this case, a predetermined gap that is larger than the thickness of the film sheet of the gas introduction section is provided between the discharge outlet of the gas injection nozzle and the receiving member. When the gas is injected from the gas injection nozzle into the gas compartment portion, the gas introduction section expands in the gap between the discharge outlet of the gas injection nozzle and the receiving member, and a gap is formed between the two film sheets of the gas introduction section, so that compressed gas can enter the gas compartment portion through the gap formed between the two film sheets. It is preferable that the size of the gap provided between the discharge outlet of the gas injection nozzle and the receiving member be sufficient to allow the two film sheets of the gas introduction section expanded as a result of gas injection to closely adhere to the discharge outlet of the gas injection nozzle and to the receiving member; in other words, it is preferable that such a gap be very small. The situation in this respect is substantially identical to the situation using a pair of (or two) gas injection nozzles. It should be noted that in the present invention either type of bag in which a bag equipped with a gas compartment portion having gas inlets formed in the film sheets of both sides of the gas introduction section and a bag equipped with a gas compartment portion having a gas inlet formed in the film sheet of only one side can be used in this method.

In the above-described gas charging method of the present invention, the discharge of the compressed gas in the direction of the gas introduction section can be initiated before the gas injection nozzles arrive (or a single gas nozzle arrives) at the advanced positions (or at the advanced position). In this case, due to the large distance between the gas introduction section of the bag equipped with a gas compartment portion and the discharge outlet(s) of the gas injection nozzle(s), it is desirable to set the pressure of the discharged compressed gas slightly higher and then lower the pressure of the compressed gas to a predetermined value (the same or a slightly higher pressure than the target pressure of the gas charged into the gas compartment portion) as the gas injection nozzle(s) arrive at the advanced positions. In accordance with this method of two step gas pressure discharge, before the gas injection nozzle(s) reaches the advanced position and gas injection into the gas compartment portion starts in earnest, high-pressure compressed gas hits the gas compartment portion, and a portion of the compressed gas enters the gas introduction section through the gas inlet(s) to expand or inflate the gas introduction section, and then the high-pressure compressed gas enters the gas compartment portion.

The above-described gas charging method of the present invention is applicable to cases in which, for example, bags equipped with gas compartment portions are conveyed along a predetermined bag conveying path in an intermittent manner (see embodiments described in Japanese Patent No. 4,771,785), and the method is further applicable to cases in which bags equipped with gas compartment portions are conveyed in a continuous manner along a predetermined bag conveying path at a constant speed. When bags equipped with gas compartment portions are conveyed in an intermittent manner, it is sufficient, for example, to carry out the injection of gas at a predetermined stop position along the bag conveying path, convey the bag to a downstream stop position along the bag conveying path with the gas blocking gripper still cramping the blockage region, and heat seal the gas introduction section or its vicinity in the same position.

As is also described in Japanese Patent No. 4,771,785, the above-described gas charging method of the present invention can be carried out as part of a bag packaging step. More specifically, if a bag equipped with a gas compartment portion is intermittently conveyed in a suspended state, with its two lateral edges held by a pair of left and right grippers, and various packaging steps, including opening the mouth of the bag, filling it with the material to be packaged, sealing the mouth of the bag, and the like, are successively carried out while the bag is being conveyed, the steps of the above-described gas charging method are added, for example, after the step of filling the bag with the material to be packaged. In this case, if the gas compartment portion extends downwardly from the vicinity of the upper edge of the bag, and the gas introduction section is formed at the upper edge of the gas compartment portion, then the entire mouth of the bag can be sealed with hot plates from both sides simultaneously with encapsulating of the gas in the gas compartment portion by sealing the gas introduction section or its vicinity with hot plates.

In addition, the steps of the above-described gas charging method of the present invention can be carried out before the step of filling the bag with the material to be packaged (preferably before the bag mouth-opening step) or, alternatively, can be carried out as a separate gas charging process, and not as part of the packaging step. In such cases, mouth sealing is not performed when encapsulating of gas in the gas compartment portion is performed by sealing the gas introduction section or its vicinity with hot plates.

The above-described object is further accomplished by a unique structure of the present invention for an apparatus for charging a bag equipped with a gas compartment portion with gas, wherein the apparatus intermittently conveys a bag, which is formed integrally therein with a gas compartment portion extending in a longitudinal direction in a sealed side edge portion of the bag and having a gas inlet that is formed in a film sheet constituting a gas introduction section of the gas compartment portion and places an exterior of the bag in communication with an interior of the gas compartment portion, along a predetermined bag conveying path and, while the bag is being conveyed, the apparatus charges the gas compartment portion with gas, wherein the apparatus is for a bag equipped with a gas compartment portion and having gas inlets formed in the film sheets of both sides of the gas introduction section, and the apparatus is comprised of a plurality of pairs of left and right bag-conveying grippers that cramp two lateral edges of the bag and are moved intermittently, thereby intermittently conveying the bag along the bag conveying path;

a pair of gas injection nozzles that are connected to a pressurized gas supply source, are disposed to face each other in the vicinity of a predetermined stop position along the bag conveying path, reciprocate between a standby position thereof and an advanced position thereof, have discharge outlets at distal ends thereof that are aligned, in the advanced position, with the gas introduction section on both sides of the bag, and inject gas into the gas compartment portion of the bag through the gas inlets;

a gas blocking gripper that is installed in conjunction with each bag-conveying gripper, moves together with each bag-conveying gripper and, while gas injection by the gas injection nozzles is in progress, cramps a blockage region, configured in the vicinity of the gas introduction section, on both sides of the bag to block fluid communication of gas between the gas introduction section and the gas compartment portion; and a pair of hot plates that are disposed in the vicinity of a stop position downstream of the above-described predetermined stop position along the bag conveying path, pressure-hold the bag from both sides in the gas introduction section or a location in a vicinity thereof to seal the gas introduction section or a vicinity thereof and encapsulate gas in the gas compartment portion, and wherein the inside diameters of the discharge outlets of the gas injection nozzles are set to be smaller than the diameter or width of the gas introduction section, the discharge outlets of the gas injection nozzles are positioned to face each other with a predetermined gap therebetween that is, when the gas injection nozzles arrive at the advanced position, larger than the thickness of the gas introduction section, and the film sheets on both sides of the gas introduction section, expanded or inflated in the gap as a result of gas injection thereinto, closely adhere to the discharge outlets of the gas injection nozzles.

The size of the gap defined between the discharge outlets of both (two) gas injection nozzles is sufficient to allow the two film sheets of the gas introduction section expanded or inflated as a result of gas injection to closely adhere to the discharge outlets of both gas injection nozzles, in other words, such a gap is very small.

Instead of the pair of gas injection nozzles positioned facing each other, as described above, it is possible to use a receiving member and one gas injection nozzle so as to face each other, with a bag equipped with a gas compartment portion therebetween. This receiving member also reciprocates, as the gas injection nozzle does, between its standby position and its advanced position; and when the gas injection nozzle is aligned, in the advanced position, with the gas introduction section, the receiving member supports the rear side of the gas introduction section in its advanced position. When both the gas injection nozzle and the receiving member arrive at the advanced position, the discharge outlet of the gas injection nozzle and the receiving member are positioned to face each other with a predetermined gap therebetween that is set to be larger than the thickness of the film sheet of the gas introduction section The size of this gap is set so that the surfaces of the film sheets on both sides of the gas introduction section, which is expanded during the injection process, closely adhere respectively to the discharge outlet of the gas injection nozzle and to the receiving member.

As described in Japanese Patent No. 4,771,785, the above-described gas charging apparatus can constitute part of a bag packaging apparatus. In such a case, an ordinary packaging apparatus used to successively perform various packaging steps along the bag conveying path, such as opening the mouths of the bags equipped with gas compartment portions, filling them with the material to be packaged, sealing the mouths of the bags, and the like, is additionally provided with members and devices used to carry out the steps of the gas charging process, such as the gas injection nozzles, and the like, in appropriate positions in the vicinity of the bag conveying path. It goes without saying that the above-described gas charging apparatus of the present invention can be a separate gas charging apparatus and not part of a packaging apparatus.

In the present invention, along with the setting of the inside diameter of the discharge outlets of the gas injection nozzles to be smaller than the diameter or width of the gas introduction section of a bag, the predetermined gap is provided between the discharge outlets of the pair of (two) gas injection nozzles at their advanced positions (aligned with the gas introduction section of the gas compartment portion) and, alternatively, the predetermined gap is provided between the discharge outlet of a single gas injection nozzle and a receiving member in their advanced positions.

As seen from the above, according to the present invention, as previously discussed, an efficient and stable injection state is obtained during gas injection into the gas compartment portion of a bag equipped with a gas compartment portion. In addition, an especially high injection efficiency is obtained when, using a pair of gas injection nozzles, injecting gas from both sides of the gas introduction section (provided that gas inlets are formed in the film sheets on both sides of the gas introduction section). Furthermore, since the gas injection nozzles are set in a predetermined advanced position, and this position does not change depending on the pressure of the gas discharged from the gas injection nozzles, there is no need to balance the gas pressure and the modulus of elasticity of the compression spring as in conventional gas injection nozzles (see Japanese Patent No. 4,771,785).

BRIEF DESCRIPTION OF THE SEVERAL VIEWS OF THE DRAWINGS

FIGS. 2(a)-2(d) are side views showing a step-by-step explanation of a gas charging method carried out by the rotary packaging apparatus of FIG. 1.

FIGS. 3(a)-3(d) are side views showing a step-by-step explanation of the steps subsequent to the step of FIG. 2(d).

FIGS. 5(a) and 5(b) are front views showing a step-by-step explanation of a gas charging method according to the present invention carried out by the rotary packaging apparatus of FIG. 1.

FIGS. 6(a) and 6(b) are front views showing a step-by-step explanation of the steps subsequent to the step FIG. 5(b).

FIGS. 10(a) and 10(b) are enlarged partial cross-sectional views showing a step-by-step explanation of the operation of the bag-conveying grippers.

FIGS. 13(a)-13(c) are top views showing a step-by-step explanation of the gas injection method carried out by the gas charging apparatus of FIG. 11.

DETAILED DESCRIPTION OF THE INVENTION

Figure 1:
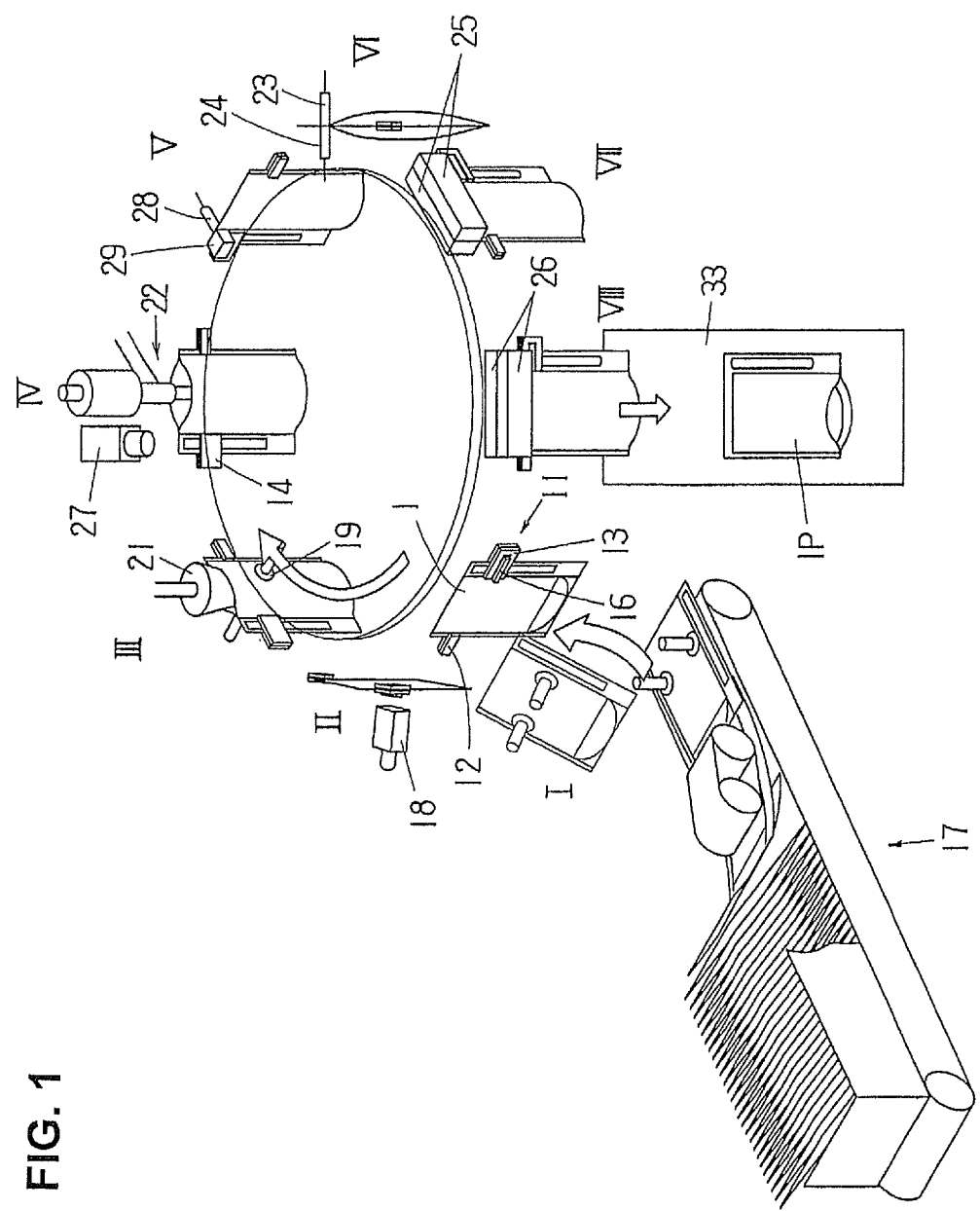
FIG. 1 is a schematic perspective view of a rotary packaging apparatus that includes a gas charging apparatus according to the present invention.

The gas charging method and apparatus according to the present invention will be described below more specifically with reference to FIGS. 1 through 13(c).

FIGS. 5(a) and 5(b) show a bag 1 equipped with a gas compartment portion. The bag 1 is a bottom-gusseted self-supporting bag that is made up of front and rear film sheets, as well as a folded bottom film sheet. In the upper region X of the bag 1, the front and rear film sheets are bonded together along the two lateral edges, thus forming seal portions 2, 3. At the upper edge, the front and rear film sheets are not bonded together, creating an open bag mouth 4. In the lower region Y of the bag 1, the front and rear film sheets are bonded along the two lateral edges, thereby sandwiching the film sheet of the bottom portion, and, in addition, are bonded on the inside, where the film sheet of the bottom portion itself is folded inward. In the central portion, the front and rear film sheets are respectively bonded to the film sheet of the bottom portion (the two sheets of film of the bottom portion are not bonded), thereby forming a seal portion 5. The seal portions 2, 3, and 5 are indicated by oblique hatching in FIGS. 5(a) and 5(b).

An unbonded portion (gas compartment portion) 6, in which the front and rear film sheets are not bonded together, is formed in part of the seal portion 2.

The gas compartment portion 6 of the bag 1 is a portion where no pressure is applied and sealing does not take place when the front and rear film sheets 7, 8 (see FIG. 10 (a)) are heat sealed. The gas compartment portion 6 has a closed, elongated, narrow outline that extends downwardly from the vicinity of the bag mouth 4 (upper edge of the seal portion 2) and has a cross-shaped incision (or a gas inlet) 9. The cross-shaped incision 9 places the interior of the gas compartment portion 6 in communication with the exterior of the bag, and it is formed in each of the front and rear film sheets 7, 8 in the vicinity of the upper edges. A neck section 6b, which extends over a predetermined length from a round gas introduction section 6a, in which the incisions 9 are formed, is formed in the gas compartment portion 6, with its lower part forming a wide main section 6c.

Embodiment 1

A packaging method and apparatus (including the gas charging method and apparatus of the present invention), in which the bag 1 equipped with a gas compartment portion is used to manufacture a product bag having a gas compartment portion by the rotary packaging apparatus, will be described below with reference to FIGS. 1 through 10(b).

In the same manner as in the rotary packaging apparatus FIG. 5 of Japanese Patent No. 4,771,785, the rotary packaging apparatus illustrated in the FIG. 1 is comprised of multiple pairs of left and right bag-conveying grippers 11, 12 installed at regular intervals around an intermittently rotating table, so that the grippers 11, 12 cramp two lateral top edge areas of each of the supplied bags 1 equipped with gas compartment portions in a suspended state while intermittently conveying the bag along a circular bag conveying path. Subsequent to supplying the bag 1 to the grippers 11, 12, in each stop position (in stop positions I-VIII), at which the grippers 11, 12 come to a stop, the bag 1 equipped with gas compartment portion cramped by the grippers 11, 12 is subjected to successive packaging operations, such as opening the mouth of the bag, filling it with the material to be packaged, sealing the mouth of the bag; and steps of the gas charging method, including a step of filling the gas compartment portion 6 with gas and a gas charging step which involves sealing the gas introduction section 6a of the gas compartment portion 6 are also performed.

Figure 8:
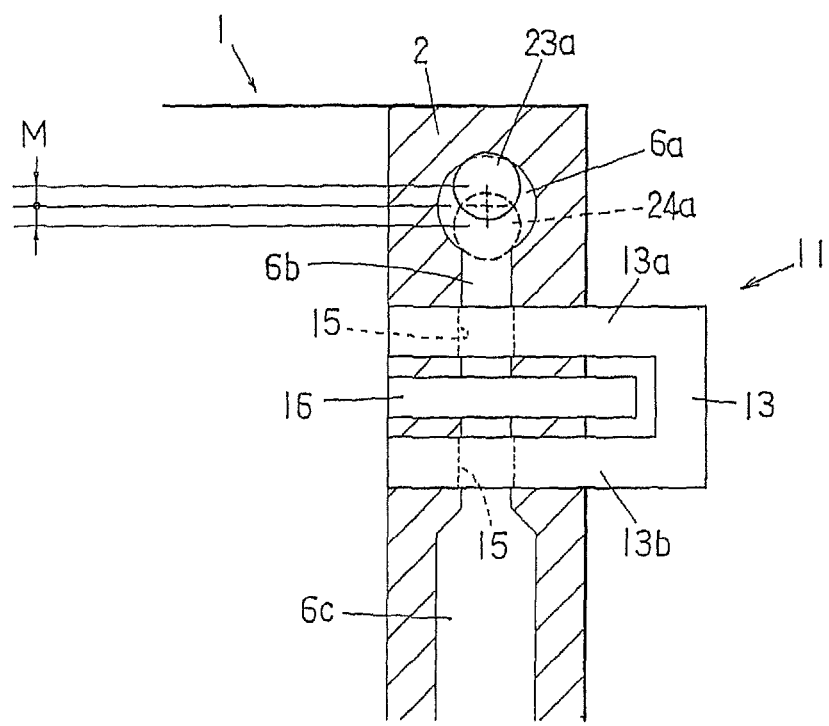
FIG. 8 is an enlarged partial front view showing the gas injection step.
Figure 9:
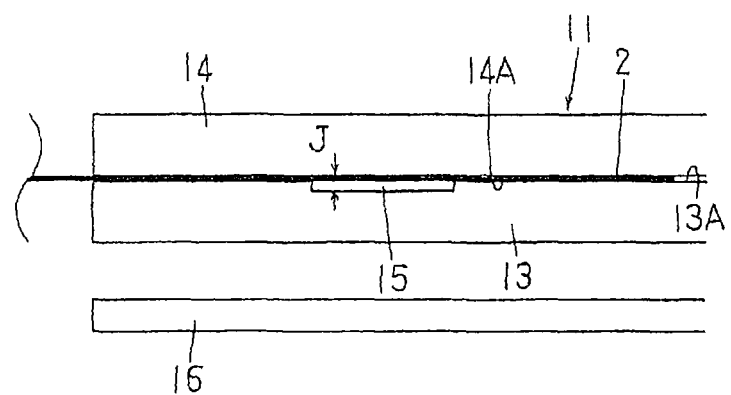
FIG. 9 is an enlarged partial cross-sectional view showing the operation of the bag-conveying grippers in the present invention.

One gripper 11 of the pair of grippers 11, 12 has, as seen from FIG. 2(a), a pair of gripping elements 13, 14. When viewed from the front, the outer gripping element 13 appears, as shown in FIGS. 5(a) and 5(b), to look substantially like a letter U turned on its side, and, on the other hand, the inner gripping element 14 appears to look substantially quadrangular (see FIG. 1, IV), with its outline substantially matching the external shape of the gripping element 13. The gripper 11 uses the gripping element 14 and the top and bottom transverse portions 13a, 13b of the gripping element 13 to cramp the front and rear sides of the sealed side edge portion 2 of the bag, in which the gas compartment portion 6 is formed. As shown in FIGS. 8 and 9, shallow grooves 15 extending in the vertical direction are formed in the gripping surfaces 13A of the top and bottom transverse portions 13a, 13b of the gripping element 13, while the gripping surface of the gripping element 14 has no grooves, etc. and is substantially flat. The area of the bag cramped by the bag-conveying gripper 11 (gripping elements 13, 14) is in the vicinity of the gas introduction section 6a of the gas compartment portion 6 formed in the seal portion 2 in such a manner that the top and bottom transverse portions 13a, 13b of the gripping element 13, along with the gripping element 14, cramp the neck section 6b in a horizontally spanning configuration. Thus, when closed, the bag-conveying gripper 11 is in a position that the grooves 15 hold the neck section 6b, and a gap J (see FIG. 9) between the two opposed faces of the gripping elements 13, 14 in the neck section 6b is wider than the thickness of the film sheets 7, 8 of the gas compartment portion 6 (see FIG. 10) by the depth of the grooves 15. In other words, even when the bag-conveying gripper 11 is closed, the gripping elements 13, 14 hold the neck section 6b with a predetermined gap J therebetween, and the neck section 6b is not cramped by the gripper elements.

The seal portion 3 at the other edge of the bag 1 is held by a regular bag-conveying gripper 12 (same as the gripper 8 of Japanese Patent No. 4,771,785).

For each pair of grippers 11, 12, a gas blocking gripper 16 is provided so as to face the gripping element 14 (see FIG. 2(a)). The gas blocking gripper 16 moves together with the grippers 11, 12 and is opened and closed at predetermined timing. When the gas blocking gripper 16 is closed, the gas blocking gripper 16 enters the space between the top and bottom transverse portions 13a, 13b of the gripping element 13 (see FIG. 3(c)) and cramps the neck section 6b of the gas compartment portion 6 of the bag from the front and rear side between itself and the gripping element 14. In the present invention, the area of the neck section 6b that is cramped by the gas blocking gripper 16 is referred to as a "blockage region".

In the above-described rotary packaging apparatus, a conveyer magazine type bag-supplying device 17 is disposed in stop position I of the bag conveying path, a printer (only a head section 18 thereof is shown) is disposed in stop position II, a mouth-opening device (only suction cups 19 and an opening head 21 thereof are shown) is disposed in stop position III, a filling device (only a nozzle section 22 thereof is shown) is disposed in stop position IV, a gas injection device (only a pair of gas injection nozzles 23, 24 thereof are shown) is disposed in stop position VI, a sealing device (only a pair of hot plates 25, 25 thereof are shown) is disposed in stop position VII, and a cooling device (only a pair of cooling plates 26, 26 thereof are shown) is disposed in stop position VIII. Furthermore, a pre-heating device (only a heated gas-blowing nozzle 27 thereof is shown) is disposed in stop position IV, and a preliminary gas injection device (only a preliminary gas injection nozzle 28 and a receiving member 29 thereof are shown) is disposed in stop position V. The pre-heating device and the preliminary gas injection device may be operated on an as-needed basis.

The packaging method that uses the rotary packaging apparatus illustrated in FIG. 1 is carried out in the following manner.

(1) In stop position I (bag-supplying station), a bag 1 equipped with a gas compartment portion is supplied to the grippers 11, 12 from the conveyer magazine type bag-supplying device 17, and the grippers 11, 12 cramp the front and rear sides of predetermined locations in the seal portions 2, 3 of the bag. When the bag is thus cramped, the neck section 6b of the gas compartment portion 6 of the bag is cramped by the gripper 11. This state is illustrated in FIG. 2(a), FIG. 5(a), and FIG. 9. At such time, the gas blocking gripper 16 is open. As shown in FIG. 9, the gap J is formed to match the groove 15 between the gripping surfaces 13A, 14A of the gripping elements 13, 14 that hold the neck section 6b of the gas compartment portion 6.

(2) In stop position II (printing station), lettering is printed on the surface of the bag using the printer.

(3) In stop position III (mouth opening station), the mouth of the bag is opened by the mouth-opening device. The two suction cups 19 of the mouth-opening device are advanced towards or retracted away from the bag 1 equipped with gas compartment portion. When the suction cups 19 are advanced, they adhere to both sides of the bag 1, and then when they are retracted, the mouth of the bag is opened as a result. The opening head 21 moves up and down above the bag 1, so that when it goes down, the lower end enters the bag through the open mouth of the bag and discharges air into the bag.

(4) In stop position IV (material filling station), the bag is filled with, for instance, a liquid substance by the filling device (see the filled material 31 in FIG. 5(b)). The nozzle portion 22 of the filling device moves up and down above the bag 1, and when it moves down, the nozzle portion 22 enters into the bag through the mouth of the bag and fills the bag with the liquid substance.

In addition, in this stop position IV, a heated gas-blowing nozzle 27, which forms part of the pre-heating device, is installed so that it is in the vicinity of the bag conveying path of the bag 1 equipped with gas compartment portion, and a pre-heating step is carried out thereby to heat the gas compartment portion 6 of the bag 1. The heated gas-blowing nozzle 27 is connected to a fan and a heating source, and its blow opening is directed at the gas compartment portion 6 of the bag 1 that comes to a stop in stop position IV. The heated gas-blowing nozzle 27 discharges hot air (heated gas) into the gas compartment portion 6 through the blow opening and heats the gas compartment portion 6 of the bag 1, which is made mostly (or entirely) of thermoplastic resin film sheet, thereby softening the film sheet that forms the gas compartment portion 6. As a result, when compressed gas is blown into the gas compartment portion 6 during the preliminary gas injection step, to be described hereafter, it is possible to weaken the adhesion of the film sheets forming the gas compartment portion 6 in a reliable manner.

(5) In stop position V (preliminary gas injection station), a preliminary gas injection nozzle 28 and a receiving member 29, which form part of the preliminary gas injection device, are installed in the vicinity of the bag conveying path of the bag 1 equipped with gas compartment portion, and a preliminary gas injection step, during which gas is blown into the gas compartment portion 6 of bag 1, is carried out thereby. The preliminary gas injection nozzle 28 is connected to a pressurized gas supply source through a diverter valve and the like, not shown. As seen from FIG. 2(a), the preliminary gas injection nozzle 28 reciprocates in a direction normal to the surface of the bag 1 between its standby position and its advanced position, and the discharge outlet 28a at the distal end thereof is aligned with the incision 9 of the bag when the preliminary gas injection nozzle 28 is in the advanced position. The receiving member 29 is disposed opposite the preliminary gas injection nozzle 28 so as to have the bag 1 in between, and it reciprocates in the same timing as but in the opposite direction to the preliminary gas injection nozzle 28 between its standby position and its advanced position. The receiving member 29, when it is in the advanced position, supports the rear side of the bag 1 while facing the discharge outlet 28a of the preliminary gas injection nozzle 28. In the distal end of the receiving member 29, a recessed portion 29a is formed. The preliminary gas injection nozzle 28 is biased forward by a compression spring 32.

As shown in FIG. 2(b), when the bag 1 comes to a stop at this preliminary gas injection station in stop position V, the preliminary gas injection nozzle 28 and the receiving member 29 are retracted and remain in the standby position. Subsequently, as shown in FIG. 2(c) and FIG. 5(b), the preliminary gas injection nozzle 28 and the receiving member 29 are advanced in synchronism to the advanced position, so that the discharge outlet 28a at the distal end of the preliminary gas injection nozzle 28 abuts the gas introduction section 6a while the receiving member 29 abuts the gas introduction section 6a of the bag on its rear side. Then immediately thereafter, compressed gas is discharged from the distal end of the preliminary gas injection nozzle 28 and injected into the gas compartment portion 6 through the incision 9. Since, as described above, the neck section 6b of the gas compartment portion 6 is not cramped by the gripping elements 13, 14 of the bag-conveying gripper 11 (and is only held thereby with the gap J provided in between), gas can be channeled to the lower body portion 6c also through the neck section 6b. This process will be discussed in detail with reference to FIG. 9 through FIG. 10(b) when describing the gas filling step.

During the injection of the gas, under the action of air pressure, the preliminary gas injection nozzle 28 is slightly retracted against the bias of the compression spring 32. As a result, the gas introduction section 6a of the gas compartment portion 6 expands and creates a space between the front and rear film sheets 7, 8 that form the gas introduction section 6a, and the gas is blown into the gas compartment portion 6 through the incision 9 on the preliminary gas injection nozzle 28 side. During this process, the receiving member 29 supports the rear side of the bag 1. Due to the fact that the recessed portion 29a is formed at the distal end of the receiving member 29, the gas introduction section 6a also expands on the rear side (which is the side proximate to the receiving member 29), thereby enhancing the influx of gas through the incision 9.

In this preliminary gas injection step, the compressed gas entering the gas introduction section 6a of the gas compartment portion 6 through the incision 9 enters the main section 6c through the neck section 6b and causes the entire gas compartment portion 6 to expand (or to inflate).

In some cases the front and rear film sheets 7, 8 constituting the gas compartment portion 6 may be entirely or partially firmly adhered to each other under the action of static electricity and the like. In such a case, the compressed gas discharged from the preliminary gas injection nozzle 28 enters the gas introduction section 6a of the gas compartment portion 6 of the bag through the incision 9, separates and spreads apart the adhered front and rear film sheets 7, 8, and causes the gas introduction section 6a to expand. Subsequently, the compressed gas enters the neck section 6b and separates and spreads apart the similarly adhered front and rear film sheets 7, 8 thereof and causes the neck section 6b to expand, and it furthermore enters the main section 6c, separates and spreads apart the likewise adhered front and rear film sheets 7, 8 thereof and causes the main section 6c to expand. The compressed gas thus weakens the adhesion of the front and rear film sheets 7, 8 for the entire of or most of the gas compartment portion 6. Softening the film sheets 7, 8 of the gas compartment portion 6 in the previous pre-heating step helps weaken the state of adhesion of the film sheets.

Subsequently, as shown in FIG. 2 (*d*), when the preliminary gas injection nozzle 28 and the receiving member 29 are retracted, and the injection of the compressed gas is stopped, the gas injected into the gas compartment portion 6 through the incision 9 immediately escapes therefrom, and the previously expanded (inflated) gas compartment portion 6 shrinks and becomes as flat as before. The bag 1 in this state is then conveyed to stop position VI.

(6) In stop position VI (gas filling station), gas injection nozzles 23, 24 that form part of the gas injection device are installed in the vicinity of the bag conveying path of the bag 1 equipped with gas compartment portion, and the gas filling step is carried out for the bag by injecting gas into the gas compartment portion 6 of the bag 1 by the gas injection nozzles 23, 24 and then by blocking fluid communication of gas between the gas introduction section 6a (incision 9) and the interior of the gas compartment portion 6 by the gas blocking gripper 16.

The gas injection nozzles 23, 24 are connected to a pressurized gas supply source through a change valve and the like, not shown, and when the discharge outlets 23a and 24a at the distal ends of the gas injection nozzles 23, 24 are oriented perpendicularly to the gas introduction section 6a of the gas compartment portion 6, the gas injection nozzles 23, 24 reciprocate between their standby position and their advanced position in mutually opposite directions perpendicularly to the bag 1 equipped with gas compartment portion. In the advanced position, the discharge outlets 23a, 24a of the gas injection nozzles 23, 24 are aligned with the gas introduction section 6a from both sides of the bag 1. The direction of gas discharge from the discharge outlets 23a, 24a is perpendicular to the bag 1.

As shown in FIG. 3(*a*), when the bag 1 is conveyed to and stops at the gas filling station, the gas injection nozzles 23, 24 are retracted and remain in the standby position. Subsequently, as shown in FIG. 3(*b*), both gas injection nozzles 23, 24 are advanced and set in the advanced position, so that the discharge outlets 23a, 24a at the distal ends thereof are aligned with the gas introduction section 6a.

Figure 7A:
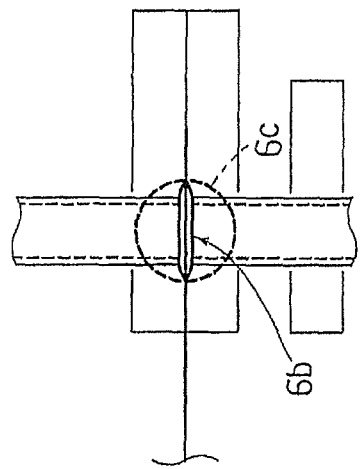
FIGS. 7(a)-7(c) enlarged partial top views showing the gas injection step in the present invention.
Figure 7B:
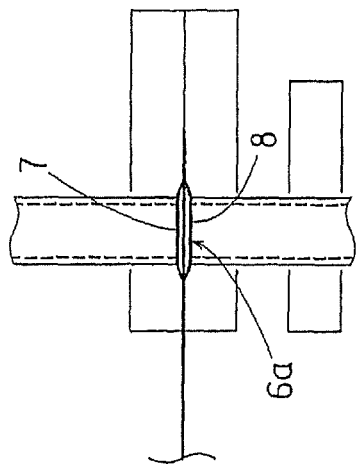
Figure 7C:
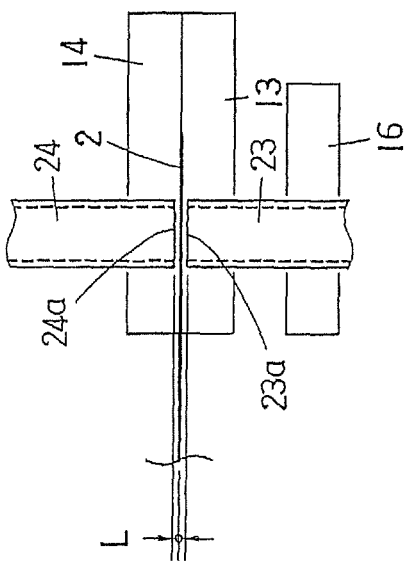

In the above process, as shown in FIG. 7(*a*), a predetermined gap L, which is slightly wider than the thickness of the two film sheets 7, 8, is left between the two discharge outlets 23a, 24a, and this gap L does not change until the gas injection nozzles 23, 24 are retracted from the advanced position. As a result of this gap L between the two discharge outlets 23a, 24a, during the gas discharge, the gas introduction section 6a of the gas compartment portion 6 expands (or inflates), a gap is formed between the film sheets 7, 8, and the gas can enter the gas compartment portion 6 (or enter the neck section 6b and main section 6c) through this gap.

As shown in FIG. 6(*a*) and FIG. 8, the inner diameters of the discharge outlets 23a, 24a of the gas injection nozzles 23, 24 are set to be smaller than the diameter of the gas introduction section 6a in which the incision 9 of the gas compartment portion 6 is formed. In this manner, making the inner diameters of the discharge outlets 23a, 24a smaller than the diameter of the gas introduction section 6a (or smaller than the width of the gas introduction section, if the gas introduction section is not round), in which the incisions 9 are formed, makes it possible to concentrate the flow of gas discharged from the gas injection nozzles 23, 24 into the gas introduction section 6a, allowing the gas injection to be done in a more efficient manner.

In addition, as shown in FIG. 3(*b*) and FIG. 8, it is arranged so that when the gas injection nozzles 23, 24 are in the advanced position, the centers of the discharge outlets 23a, 24a of the gas injection nozzles 23, 24 are offset from the centers of the incisions 9 by equal distances, with a total gap of M. As a result of such an arrangement, it is possible to prevent positional problems from arising during gas injection even when the position of the bag 1 cramped by the grippers 11, 12 slightly deviates from the originally set position (the position illustrated in FIG. 8) in the vertical direction or even when the position, in which the incisions 9 are formed, slightly deviates from the center of the gas introduction section 6a in the vertical direction.

When the gas injection nozzles 23, 24 initiate gas injection in the advanced position, compressed gas is injected through the incisions 9 formed in the two film sheets 7, 8 into the gas introduction section 6a of the gas compartment portion 6, and, as shown in FIG. 7(*b*), the gas introduction section 6a expands. As a result, the film sheets 7, 8 adhere to the discharge outlets 23a, 24a of the gas injection nozzles 23, 24. In other words, the gap L between the discharge outlets 23a, 24a of the gas injection nozzles 23, 24 that are in the advanced position is set to a size that is sufficient for the film sheets 7, 8 of the expanded gas introduction section 6a to closely adhere to the discharge outlets 23a, 24a. When the gas introduction section 6a expands, a gap is formed between the film sheets 7, 8 in the gas introduction section 6a, after which the compressed gas enters the neck section 6b and the main section 6c, and, as shown in FIG. 7(*c*), the entire gas compartment portion 6 expands. Since the state of adhesion of the film sheets 7, 8 of the gas compartment portion 6 has already been weakened in the preliminary gas injection step, the gas injection and the filling of the gas compartment portion 6 with gas in this gas filling step are accomplished smoothly without problems.

On the other hand, in the areas gripped by the gripping element 13 (or by the transverse portions 13a, 13b) and the gripping element 14 in the gas compartment portion 6 (in particular, in the neck section 6b) (these areas are hereinafter referred to as the "restriction regions") and in their vicinity, free expansion is impeded by the inner surfaces 13A, 14A of the gripping elements 13, 14 facing each other across a gap J (see FIG. 9), so that the expanded shape is restricted to a thin and flat configuration, as shown in FIG. 10(*a*). The gas injected into the gas compartment portion 6 flows downwardly through the space between the two film sheets 7, 8 in the restriction regions of the neck section 6b. In a very similar manner, during the preliminary gas injection step, the expanded shape of the restriction region is also restricted to a thin and flat configuration.

Subsequently, as shown in FIG. 3(*c*) and FIG. 10(*b*), the gas blocking gripper 16 closes and cramps, in conjunction with the gripping element 14, the blockage region configured between the transverse portions 13a, 13b of the gripping element 13 (between the restriction regions) on both sides. As a result, the blockage region is completely compressed, and the fluid communication of gas between the gas introduction section 6a (incision 9) and the interior of the gas compartment portion 6 is blocked. Thereafter, the gas injection nozzles 23, 24 are retracted (FIG. 3 (d)), and the bag 1 equipped with gas compartment portion is conveyed to the next stop position VII while being maintained in the blocked state made by the gas blocking gripper 16 and the gripping element 14.

If the blockage region is significantly (roundly) expanded (inflated) before the gas blocking gripper 16 is closed, sometimes, then the film sheets 7, 8 are folded in when the gas blocking gripper 16 is closed, and as a result the blockage region cannot be completely compressed. However, the restriction regions affect the blockage region, causing the expanded shape of the blockage region to assume a thin and flat configuration. As a result, when the gas blocking gripper 16 is closed, the film sheets 7, 8 in the blockage region can be completely compressed into a flat configuration, and the fluid communication of gas can be reliably blocked.

Figure 4C:
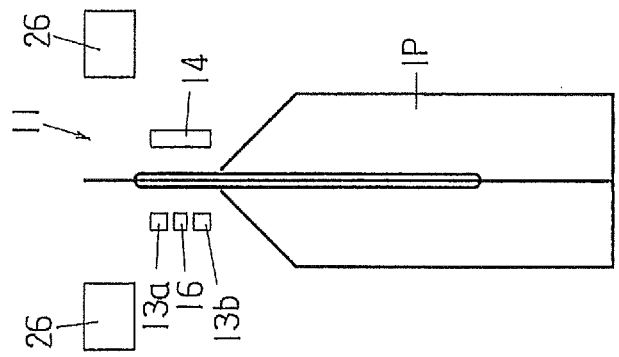
FIGS. 4(a)-4(c) are side views showing a step-by-step explanation of the steps subsequent to the step of FIG. 3(d).
Figure 4B:
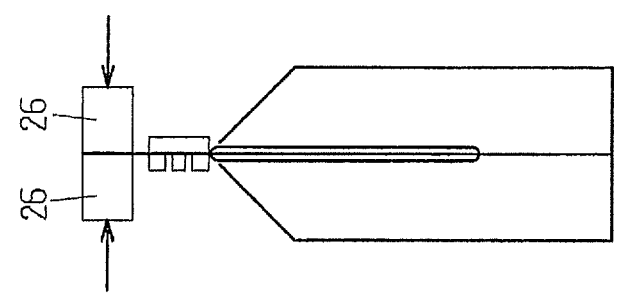
Figure 4A:
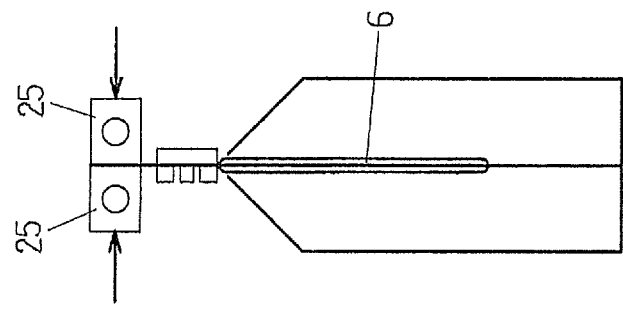

(7) In stop position VII (gas charging station), a pair of hot plates 25, 25 forming part of the sealing device are disposed in the vicinity of the bag conveying path of the bag 1 equipped with gas compartment portion; and in this stop position VII, a gas charging step which involves sealing the gas introduction section 6a of the bag 1 is carried out, and simultaneously a mouth-sealing step which involves sealing the mouth of the bag 1 is carried out. When the bag 1 comes to a stop in this gas charging station, the hot plates 25, 25 that have been opened are closed, and as shown in FIG. 4(a) and FIG. 6(b) the film sheets 7, 8 of the front and rear surface of the bag 1 are pressure-held in the gas introduction section 6a and the mouth of the bag on both sides, and they are sealed (to form the seal portion 32). As a result, the gas is encapsulated in the gas compartment portion 6 of the bag 1, and at the same time the packaged material 31 is hermetically enclosed inside the bag 1. In this state, the bag 1 is conveyed to stop position VIII.

(8) In stop position VIII (seal cooling and discharge station), a pair of cooling plates 26, 26 forming part of the cooling device are disposed in the vicinity of the bag conveying path of the bag 1. The cooling plates 26, 26 cool the locations that are sealed in the previous step by pressure-holding them on both sides, as shown in FIG. 4(b). Subsequently, as shown in FIG. 4(c), during the cooling process, the gas blocking gripper 16 and the bag-conveying grippers 11, 12 are opened, the cooling plates 26, 26 are opened as well, and the bag 1P (product bag equipped with gas compartment portion) falls onto the chute 33, which discharges the bag 1P from the apparatus. The gas blocking gripper 16 can be opened at the point when the gas sealing step ends.

Embodiment 2

Figure 11:
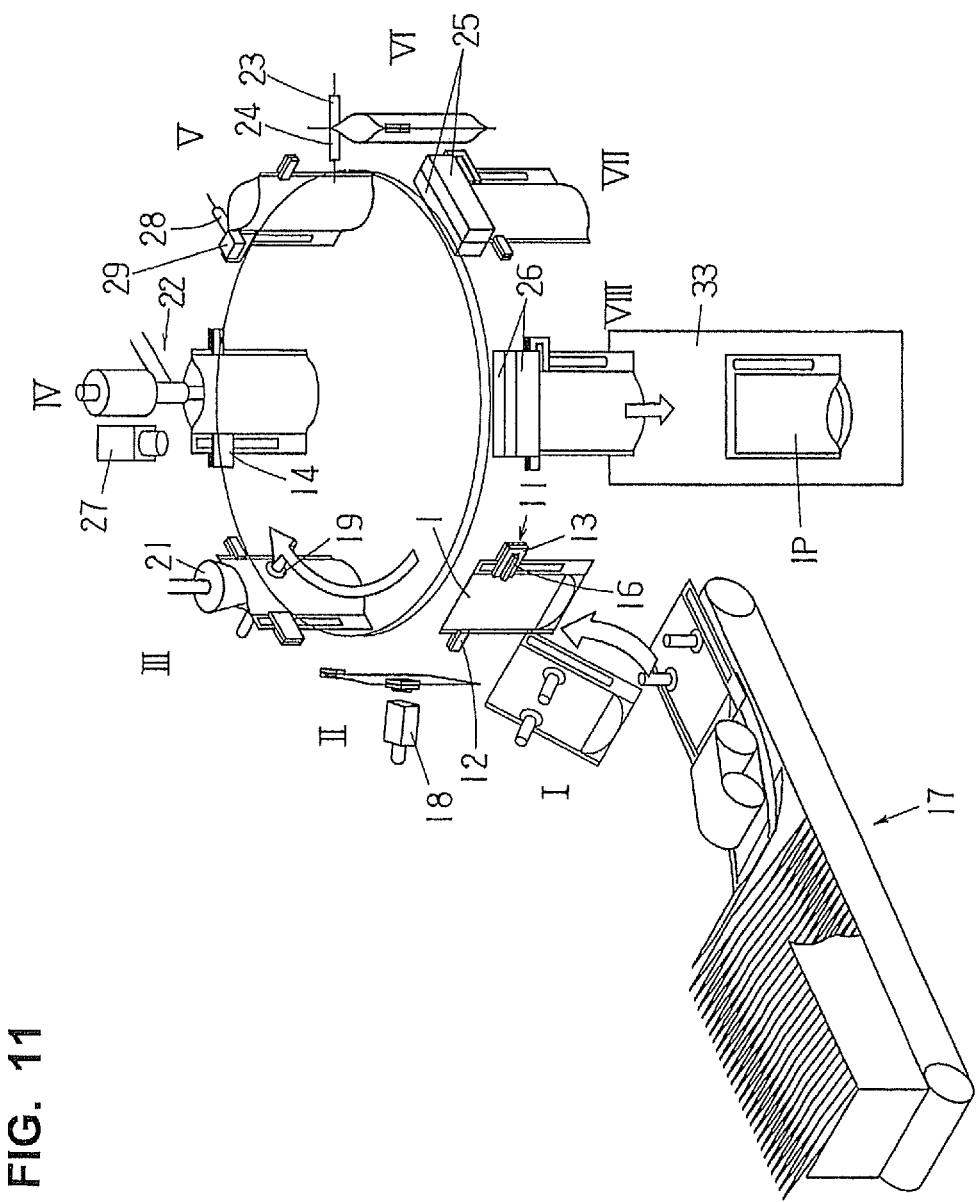
FIG. 11 is a schematic perspective view of a rotary packaging apparatus that includes another gas charging apparatus according to the present invention.

Next, another gas charging method and apparatus according to the present invention will be described with reference to FIG. 11. In FIG. 11, the same reference numerals are assigned to substantially the same elements as those of the bag equipped with gas compartment portion and gas charging apparatus described in Embodiment 1.

In Embodiment 2, the bag 1 equipped with gas compartment portion is identical to that used in Embodiment 1, and the rotary packaging apparatus and the peripheral devices are substantially the same as those of Embodiment 1; however, the timing of the gap adjustment between the grippers 11, 12 (movement of these grippers towards and away from each other) is different from Embodiment 1. This difference (or Embodiment 2) will be described below.

In Embodiment 1, as shown in FIG. 1, after performing the packaged material filling step in stop position IV, the gap between the grippers 11, 12 is widened to stretch the bag 1 equipped with gas compartment portion in the bag width direction, and by way of maintaining the mouth of the bag in tension or stretched (thus keeping the mouth of the bag closed), the steps that follow the stop position V (preliminary gas injection station) are carried out in that state.

On the other hand, in Embodiment 2, as seen from FIG. 11, after having performed the packaged material filling step in stop position IV, the mouth of the bag is kept opened, and keeping the mouth thus opened, the preliminary gas injection step (stop position V) and the gas filling step (stop position VI) are carried out; and then prior to the gas charging step in stop position VII (before the hot plates 25, 25 are closed), the grippers 11, 12 are moved away from each other and the gap in between is widened, so that the bag 1 is stretched in its width direction to give it a tension (thus closing the mouth of the bag).

When, as described above, the gap between the grippers 11, 12 is widened, the bag 1 equipped with gas compartment portion is stretched in the bag width direction, and the mouth of the bag is thus brought into a tensioned state, then the portion of the bag 1 above the grippers 11, 12 may fold in the thickness direction, and the mouth of the bag, as well as its vicinity, may tilt. Since the gas introduction section 6a of the gas compartment portion 6 of the bag 1 is located near the mouth, in Embodiment 1, the gas introduction section 6a of the bag tilts, and the preliminary gas injection step and the gas filling step would be hindered, depending upon the magnitude of the tilt of the bag. However, in Embodiment 2, this problem can be prevented.

Embodiment 3

Still another gas charging method and apparatus of the present invention will be described below with reference to FIGS. 12 and 13(a) through 13(c). In FIGS. 12 and 13(a) through 13(c), the same reference numerals are assigned to substantially the same elements of the bag 1 and the gas charging apparatus described in Embodiment 1.

In Embodiment 3, the bag 1 equipped with a gas compartment portion is identical to that used in Embodiment 1, and the rotary packaging apparatus and the peripheral devices are also substantially the same those in Embodiment 1; and only difference in Embodiment 3 is the manner of control over the gas discharge from the gas injection nozzles 23, 24. This difference (or Embodiment 3) will be described below.

In Embodiment 1, the gas injection nozzles 23, 24 initiate compressed gas discharge after being set in the advanced position and terminate the compressed gas discharge after the gas blocking gripper 16 is closed.

In Embodiment 3, the gas injection nozzles 23, 24 initiate compressed gas discharge prior to arriving at the advanced position, the pressure of the compressed gas is reduced to a specified value simultaneously with the arrival at the advanced position and then stop the compressed gas discharge after the gas blocking gripper 16 is closed. Embodiment 3 will be described next more specifically with reference to FIGS. 12 and 13(a) through 13(c).

Figure 12:
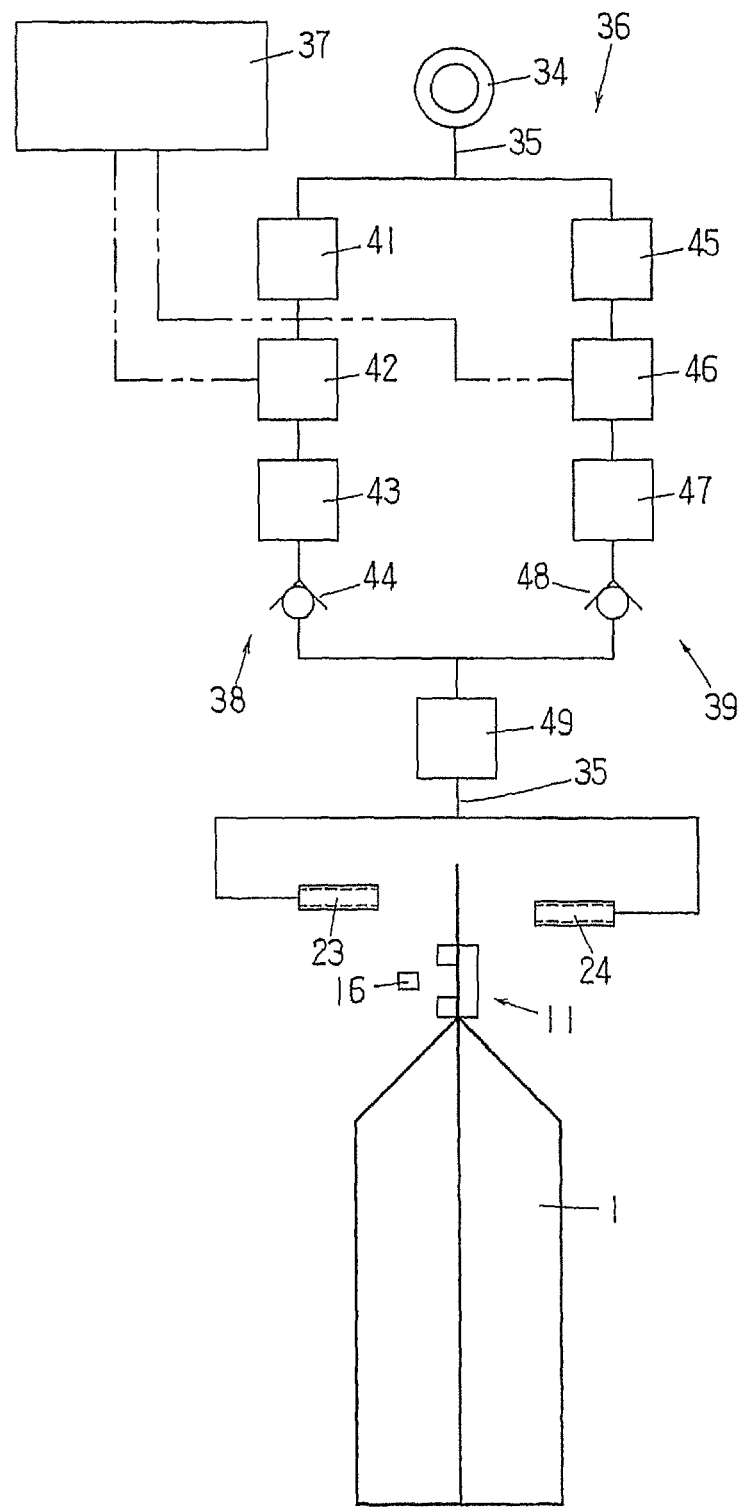
FIG. 12 is a component diagram of a pressure switching device that is a part of the gas charging apparatus of FIG. 11.

FIG. 12 illustrates a pressure switching device 36 connected to a gas pipe arrangement 35 and installed between gas injection nozzles 23, 24 and a pressurized gas supply source 34, and it also illustrates a controller 37 that controls the pressure switching device 36. The pressure switching device 36 includes a high-pressure channel 38 and a low-pressure channel 39 that are connected in parallel to the gas pipe arrangement 35. The high-pressure channel 38 has a pressure regulating valve 41, a channel shut-off valve 42, a flow regulating valve 43, and a check valve 44 which are connected in series; and the low-pressure channel 39 likewise has a pressure regulating valve 45, a channel shut-off valve 46, a flow regulating valve 47, and a check valve 48 which are connected in series as well. The pressure of the pressure regulating valve 41 is set to be higher than the set pressure of the pressure regulating valve 45, and the pressure of the pressure regulating valve 45 is set to a target pressure value of the gas that will be charged into the gas compartment portion 6 or a slightly higher value. The pressure regulating valve 41 of the high-pressure channel 38, the flow regulating valves 43 and 47, and the check valves 44 and 48 are not essential, and a reasonable degree of control can be made possible even without them. However, with the pressure regulating valve 41 and the flow regulating valves 43, 47 installed, it is possible to stabilize the pressure of the gas to be discharged from the gas injection nozzles 23, 24 and, therefore, the pressure of the gas to be charged into the gas compartment portion 6.

In addition, a relief valve 49 is installed in the gas pipe arrangement 35 so as to be located between the pressure switching device 36 and the gas injection nozzles 23, 24. The controller 37 controls the opening and closing of the channel shut-off valves 42, 46.

The control over the discharge of the gas from the gas injection nozzles 23, 24 is exercised as follows.

(1) When the gas injection nozzles 23, 24 are in a standby position, the channel shut-off valves 42, 43 are closed, and no discharge of compressed gas is performed.

(2) When the gas injection nozzles 23, 24 start moving from the standby position in the direction of the advanced position, the channel shut-off valve 42 of the high-pressure channel 38 is simultaneously opened by the controller 37. FIG. 13(a) illustrates a situation that the gas injection nozzles 23, 24 have started moving toward the advanced position, in which a high-pressure gas, whose pressure is set by the pressure regulating valve 41, is discharged from the discharge outlets 23a, 24a of the gas injection nozzles 23, 24 in the direction toward the gas introduction section 6a of the gas compartment portion 6 of the bag, and part of the gas enters the gas introduction section 6a through the incision 9, causing a slight expansion of the gas introduction section 6a. Part of the gas entering the gas introduction section 6a also enters the neck section 6b and then enters the main section 6c before the gas injection nozzles 23, 24 arrive at the advanced position. As the gas injection nozzles 23, 24 are moved towards the advanced position, the high-pressure gas is blown at the gas compartment portion 6, and part of it enters into the gas compartment portion 6; and, as a result, even if the film sheets 7, 8 of the gas compartment portion 6 are adhered to each other, their state of adhesion is weakened, allowing a smooth gas injection (gas injection after the gas injection nozzles 23, 24 has arrived at the advanced position) during the next step.

(3) As shown in FIG. 13(b), when the gas injection nozzles 23, 24 arrive at the advanced position, and the discharge outlets 23a, 24a of these nozzles 23, 24 are aligned with the gas introduction section 6a, the channel shut-off valve 42 of the high-pressure channel 38 is closed, and the channel shut-off valve 46 of the low-pressure channel 39 is opened by the controller 37. As a result, a low-pressure gas, of which pressure is set by the pressure regulating valve 45, is discharged in the direction of the gas introduction section 6a of the gas compartment portion 6 of the bag, the gas introduction section 6a is expanded by the compressed gas entering through the incision 9, and the spread-apart film sheets 7, 8 are tightly adhered to the discharge outlets 23a, 24a of the gas injection nozzles 23, 24.

The gas entering the gas introduction section 6a enters the neck section 6b and the main section 6c, so that, as shown in FIG. 13(c), the main section 6c expands, and the gas pressure inside the gas compartment portion 6 rises to the target value. After the gas pressure inside the gas compartment portion 6 rises to the target value, the excess gas (not entered the gas compartment portion) is appropriately discharged from the relief valve 49.

(4) Upon lapse of a predetermined time period, the gas blocking gripper 16 is closed, and the channel shut-off valve 46 of the low-pressure channel 39 is closed by the controller 37, and further the gas injection nozzles 23, 24 retreat toward the standby position.

Embodiment 4

Next, a gas charging method and apparatus, which is a variation of Embodiment 3 and is different only in terms of the manner of control over the reciprocation of the gas injection nozzles 23, 24, will be described.

In Embodiment 3, only one location is provided so as to be used as the advanced position of the gas injection nozzles 23, 24. Embodiment 4, however, two locations, i.e. a first advanced position and a second advanced position are provided as the advanced positions of the gas injection nozzles 23, 24. More specifically, after the gas injection nozzles 23, 24 advance from the standby position and arrive at the first advanced position, they halt or makes a first stop there (or at the first advanced position) and, at a predetermined timing, they once again advance and arrive at the second advanced position, and then they stop there to make a second stop. Needless to say, the first advanced position is a position that is more remote from the bag 1 than the second advanced position (the gap between the discharge outlets 23a, 24a of the gas injection nozzles 23, 24 is slightly larger at the first advanced position). In the first advanced position, when the gas introduction section 6a is expanded by the gas injected from the gas injection nozzles 23, 24, the spread-apart film sheets 7, 8 of the gas introduction section 6a closely adhere to the discharge outlets 23a, 24a. In other words, the gap between the discharge outlets 23a, 24a of the gas injection nozzles 23, 24 stopped in the first advanced position is set to a size that is sufficient for the film sheets 7, 8 of the expanded gas introduction section 6a to closely adhere to the discharge outlets 23a, 24a.

In this Embodiment 4, the manner of control over the discharge of gas from the gas injection nozzles 23, 24 is substantially the same as that in Embodiment 3.

Control of the discharge of gas from the gas injection nozzles 23, 24 and control of the reciprocation of the gas injection nozzles 23, 24 are performed as follows (see FIG. 13):

(1) When the gas injection nozzles 23, 24 are in a standby position, no compressed gas discharge is made.

(2) When the gas injection nozzles 23, 24 start moving from the standby position in the direction of the first advanced position, a high-pressure gas is discharged from the discharge outlets 23a, 24a of the gas injection nozzles 23, 24 in the direction of the gas introduction section 6a of the gas compartment portion 6 of the bag.

(3) The pressure of the gas is switched as the gas injection nozzles 23, 24 arrive at the first advanced position, and the discharge outlets 23a, 24a are aligned with the gas introduction section 6a, so that a low-pressure gas is discharged in the direction of the gas introduction section 6a of the gas compartment portion 6. As a result, the gas introduction section 6a expands or inflate under the action of the compressed gas entering through the incision 9 and the spread-apart film sheets 7, 8 closely adhere to the discharge outlets 23a, 24a of the gas injection nozzles 23, 24.

(4) Next, the gas injection nozzles 23, 24 again advance slightly and arrive at the second advanced position, where they make the second stop and positioned. During this process, the film sheets 7, 8 of the gas introduction section 6a are kept closely adhered to the discharge outlets 23a, 24a of the gas injection nozzles 23, 24.

(5) Upon lapse of a predetermined time period, the gas blocking gripper 16 is closed, the discharge of the compressed gas is stopped, and the gas injection nozzles 23, 24 retreat in the direction of the standby position.

In Embodiment 4, the gap between the discharge outlets 23a, 24a of the gas injection nozzles 23, 24 at the first advanced position is relatively larger, and thus the gas introduction section 6a can accordingly expand to comply with such a relatively larger gap. For this reason, the gap between film sheets 7, 8 of the gas introduction section 6a widens, and the injection of gas into the gas introduction section 6a, as well as the inflow thereof into the neck section 6b and the main section 6c, is accomplished smoothly. However, the larger the gap between the discharge outlets 23a, 24a, the more unstable (leaky) the state of adhesion of film sheets 7, 8 to the discharge outlets 23a, 24a, and thus the gas pressure inside the gas compartment portion 6 might lack stability to achieve a target gas pressure value.

Subsequently, when the gas injection nozzles 23, 24 arrive at the second advanced position, the gap between the discharge outlets 23a, 24a is slightly constricted, the state of adhesion between the discharge outlets 23a, 24a and the film sheets 7, 8 of the gas introduction section 6a becomes more stable, the gas pressure inside the gas compartment portion 6 is stabilized, and it becomes possible to achieve the target gas pressure value of the gas compartment portion 6 in a reliable manner. In the second advanced position, the gap between the discharge outlets 23a, 24a is constricted, and as a result of which the expanded or inflated gas introduction section 6a assumes a somewhat compressed configuration, and the injection of gas into the gas introduction section 6a and, furthermore, the inflow of the gas into the neck section 6b and the main section 6c, becomes difficult to be accomplished as smoothly as in the case in which the gas injection nozzles 23, 24 are in the first advanced position. However, this does not create substantial problems because at the time of arrival at the second advanced position, the gas compartment portion 6 is already filled with gas at a pressure close to the target value.

The present invention is described above in detail with reference to FIGS. 1 through 13(c), and the present invention can take other manners as described below:

(1) Although the foregoing description is made for the bag that has the incision 9 at the upper edge of the gas compartment portion 6, the bag can be formed with an opening (a type of gas inlet) instead of the incision 9.

(2) Although the foregoing description is made for the bag that has a neck section 6b formed in the gas compartment portion 6 with the neck section being smaller in width than the gas compartment portion 6, the entire gas compartment portion 6 can be made to have the same width for its entire length (depth) as seen in the bag equipped with gas compartment portion described in Japanese Patent No. 4,771,785.

(3) The foregoing description is made for the bag-conveying grippers 11 that clamp the seal portion 2 in which the gas compartment portion 6 is formed, and the bag-conveying grippers 11 clamp the seal portion 2 across the gas compartment portion 6; however, the grippers can be adapted to clamp the outside of the gas compartment portion only as in the same manner as the bag-conveying grippers described in Japanese Patent No. 4,771,785.

(4) The foregoing description is made for the bag in which the blockage region is clamped between the gas blocking gripper 16 and the gripping element 14 of the bag-conveying gripper 11, and the gripping element 14 is used as a member that is on the other side of the gas blocking gripper 16. It is, however, possible to install an independent pair of gas blocking grippers in the same manner as the gas blocking grippers described in Japanese Patent No. 4,771,785.

(5) Although the foregoing description is made for the arrangement in which the restriction regions (regions in which the expanded shape of the gas compartment portion is restricted to a flat configuration) are provided above and below the blockage region clamped by the gas blocking gripper 16, the restriction region can be provided only at a single location.

(6) The foregoing description is made for the gas injection means in which the preliminary gas injection nozzle 28 and the receiving member 29 are used in the preliminary gas injection step, and the pair of gas injection nozzles 23, 24 are used in the gas filling step; however, this arrangement can be made other way around, and also the same gas injection means can be employed in both steps. When the gas injection nozzle 28 and the receiving member 29 are used in the gas filling step, the discharge control of the preliminary gas injection nozzle 28 and the reciprocation control of the gas injection nozzle 28 and the receiving member 29 can be implemented in the same way as in the case of the gas injection nozzles 23, 24.

When the preliminary gas injection nozzle 28 and the receiving member 29 are used as a gas injection means in both preliminary gas injection step and gas filling step, the gas inlet can be formed in one of the front and rear film sheets (or in the film sheet to which the gas injection nozzle 28 faces).

(7) Although the preliminary gas injection step, the gas filling step, and the gas charging step are performed after the filling step for the material to be packaged, the preliminary gas injection step is not essential. In addition, these steps can be performed before the material filling step.

In addition, although the foregoing description is made for the gas charging method and apparatus configured as part of a packaging method and apparatus, they can be separated from the opening of the mouth of the bag and its filling with the material to be packaged and can be configured as a separate gas charging method and gas charging apparatus.

(8) The foregoing description is made for the gas charging method and apparatus in which bags equipped with gas compartment portions are conveyed intermittently; however, the present invention can be applied also to a case in which bags equipped with gas compartment portions are conveyed in a continuous manner at a constant speed (for example, see Patent Publication 2009-161230). If the bags equipped with gas compartment portions are moved in a continuous manner, then, for example, the gas blocking grippers are moved continuously together with the bags, and components such as the gas injection nozzles, preliminary gas injection nozzles, heated gas-blowing nozzles, hot plates and the like are moved back after having been moved along with the bag for a predetermined distance and carry out their own processing while being moved with the bag.

The invention claimed is:

1. An apparatus for charging a bag equipped with a gas compartment portion with gas that intermittently conveys a bag, which is formed integrally therein with a gas compartment portion extending in a longitudinal direction in a sealed side edge portion of the bag and having a gas inlet that is formed in a film sheet constituting a gas introduction section of the gas compartment portion and places an exterior of the bag in communication with an interior of the gas compartment portion, along a predetermined bag conveying path and, while the bag is being conveyed, charges the gas compartment portion with gas,
wherein
said apparatus is for a bag equipped with a gas compartment portion and having inlets formed in film sheets of both sides of the gas introduction section, and
said apparatus is comprised of
a plurality of pairs of bag-conveying grippers that cramp two lateral edges of the bag and are moved intermittently, thereby intermittently conveying the bag along the bag conveying path;
a pair of gas injection nozzles that are connected to a pressurized gas supply source, are disposed to face each other in the vicinity of a predetermined stop position along the bag conveying path, reciprocate between a standby position thereof and an advanced position thereof, have discharge outlets at distal ends thereof that are aligned, in the advanced position, with the gas introduction section on both sides of the bag, and inject gas into the gas compartment portion of the bag through the gas inlets;
a gas blocking gripper that is installed in conjunction with each bag-conveying gripper, moves together with each bag-conveying gripper and, while gas injection by the gas injection nozzles is in progress, cramps a blockage region, configured in the vicinity of the gas introduction section, on both sides of the bag to block fluid communication of gas between the gas introduction section and the gas compartment portion; and
a pair of hot plates that are disposed in the vicinity of a stop position downstream of said predetermined stop position along the bag conveying path, pressure-hold the bag from both sides in the gas introduction section or a location in a vicinity thereof to seal the gas introduction section or a vicinity thereof and encapsulate gas in the gas compartment portion, and
wherein
the gas introduction section is round,
inside diameters of the discharge outlets of the gas injection nozzles are set to be smaller than a diameter of the gas introduction section,
the discharge outlets of the gas injection nozzles are positioned to face each other with a predetermined gap therebetween that is, when the gas injection nozzles arrive at the advanced position, larger than a thickness of the gas introduction section,
film sheets on both sides of the gas introduction section, expanded in the gap as a result of gas injection thereinto, closely adhere to the discharge outlets of the gas injection nozzles, and
longitudinal axes of the discharge outlets of both gas injection nozzles at the advanced position are offset in a vertical direction from each other.

2. The apparatus for charging a bag equipped with a gas compartment portion with gas according to claim 1, wherein a pressure switching device that switches pressure of the gas discharged from the gas injection nozzle from high pressure to low pressure is connected to a gas pipe arrangement provided between the gas injection nozzle and the pressurized gas supply source.

* * * * *